(12) United States Patent
Pederzini et al.

(10) Patent No.: US 10,696,490 B2
(45) Date of Patent: Jun. 30, 2020

(54) SYSTEM AND METHOD FOR ORDERING ELEMENTS, SPECIFICALLY FOR PACKAGING

(71) Applicant: SYSTEM LOGISTICS S.P.A., Fiorano Modenese (Modena) (IT)

(72) Inventors: Stefano Pederzini, Formigine (IT); Andrea Ori, Castellarano (IT)

(73) Assignee: SYSTEM LOGISTICS S.P.A., Fiorano Modenese (Modena) (IT)

( * ) Notice: Subject to any disclaimer, the term of this patent is extended or adjusted under 35 U.S.C. 154(b) by 38 days.

(21) Appl. No.: 16/083,380

(22) PCT Filed: Mar. 9, 2017

(86) PCT No.: PCT/IB2017/051378
§ 371 (c)(1),
(2) Date: Sep. 7, 2018

(87) PCT Pub. No.: WO2017/153940
PCT Pub. Date: Sep. 4, 2017

(65) Prior Publication Data
US 2019/0100385 A1   Apr. 4, 2019

(30) Foreign Application Priority Data

Mar. 10, 2016 (IT) .............................. 102016025070

(51) Int. Cl.
*B65G 43/10* (2006.01)
*B07C 5/36* (2006.01)
(Continued)

(52) U.S. Cl.
CPC ................ *B65G 43/10* (2013.01); *B07C 5/36* (2013.01); *B07C 5/38* (2013.01); *B65G 1/137* (2013.01); *B65G 1/1376* (2013.01)

(58) Field of Classification Search
CPC ........ B65G 43/10; B65G 1/137; B65G 1/376; B07C 5/36; B07C 5/38
(Continued)

(56) References Cited

U.S. PATENT DOCUMENTS 6,139,240 A * 10/2000 Ando .................... B65G 47/844
                                                      414/267
7,121,398 B2 * 10/2006 Affaticati .................. B07C 5/36
                                                      198/357
(Continued)

FOREIGN PATENT DOCUMENTS

DE    102005061309 A1    7/2007
EP       0860382 A1      8/1998
(Continued)

OTHER PUBLICATIONS

International Search Report for International Application PCT/IB2017/051378 filed Mar. 9, 2017 on behalf of Systems Logistics S.P.A. dated Jun. 29, 2017. 4 pages.
(Continued)

*Primary Examiner* — Douglas A Hess
(74) *Attorney, Agent, or Firm* — Steinfl + Bruno LLP (57) ABSTRACT

A system for ordering elements. The system includes i) a source with a plurality of elements that are randomly arranged; ii) a plurality of source output lines associated to the source; iii) a synchronising station with a plurality of synchronising channels; and iv) a processing unit configured for starting up and timing the functions of one or more from among the source with a plurality of elements, the plurality of source output lines and the synchronising station. The processing unit has a synchronising module configured for sending, independently, to each motorising means, one from among a setting signal of a predefined velocity or a stop
(Continued)

signal. Also included is a method for ordering elements that describes the functions of the corresponding system.

23 Claims, 2 Drawing Sheets (51) Int. Cl.
*B07C 5/38* (2006.01)
*B65G 1/137* (2006.01)

(58) Field of Classification Search
USPC .................. 198/348, 349, 349.1, 349.6, 358
See application file for complete search history.

(56) References Cited

U.S. PATENT DOCUMENTS

| 7,233,840 | B2* | 6/2007 | Schiesser | B65G 15/22 |
| | | | | 198/395 |
| 7,909,155 | B2* | 3/2011 | Lupton | B65G 43/08 |
| | | | | 198/357 |
| 8,886,356 | B2* | 11/2014 | Magato | B65G 43/08 |
| | | | | 700/213 |
| 9,037,290 | B2* | 5/2015 | Neiser | B65G 43/10 |
| | | | | 700/230 |
| 9,199,799 | B2* | 12/2015 | Neiser | B65G 43/00 |
| 9,199,802 | B2* | 12/2015 | Neiser | B65G 47/268 |
| 9,364,865 | B2* | 6/2016 | Kim | B07C 3/02 |
| 9,738,455 | B2* | 8/2017 | Neiser | B65G 43/08 |
| 9,771,218 | B2* | 9/2017 | Meurer | B65G 1/1378 |
| 9,957,107 | B2* | 5/2018 | Peng | B65G 1/0457 |
| 10,016,789 | B2* | 7/2018 | Eger | B07C 3/06 |
| 10,022,752 | B1* | 7/2018 | Rothermel | B07C 3/08 |
| 10,106,330 | B2* | 10/2018 | Maines | B65G 47/46 |
| 10,226,794 | B2* | 3/2019 | Vegh | B07C 3/006 |
| 10,229,383 | B2* | 3/2019 | Danelski | G06Q 10/087 |
| 2007/0119690 | A1 | 5/2007 | Lupton | |
| 2009/0065330 | A1 | 3/2009 | Lupton et al. | |
| 2019/0322454 | A1* | 10/2019 | Wan et al. | |

FOREIGN PATENT DOCUMENTS

| EP | 1375389 A1 | 1/2004 |
| JP | 2015040122 A | 3/2015 |
| WO | 2004/026737 A1 | 4/2004 |

OTHER PUBLICATIONS

Written Opinion for International Application PCT/IB2017/051378 filed Mar. 9, 2017 on behalf of Systems Logistics S.P.A. dated Jun. 29, 2017. 5 pages.

* cited by examiner

SYSTEM AND METHOD FOR ORDERING ELEMENTS, SPECIFICALLY FOR PACKAGING

CROSS REFERENCE TO RELATED APPLICATIONS

The present application is the U.S. National Stage of International Patent Application No. PCT/IB2017/051378 filed on Mar. 9, 2017 which, in turn, claims priority to Italian Application No. 102016000025070 filed on Mar. 10, 2016.

The present invention relates to a system and method for ordering elements.

In particular, the present invention relates to a system and method for ordering elements for packaging.

Even more in particular, the present invention relates to a system and method for ordering elements for packaging in which the elements are packages with very variable formats, sizes and types of packaging.

The invention applies to different sectors such as, by way of a non-limiting example, the production of drinks and food grouped into packages and the example that follows shall refer to this field of application for the sole purpose of simplifying the description.

PRIOR ART

To date, packages moving in ordering systems only move jointly if, for whatever reason, a package does not get stuck during movement.

Systems of the prior art envisage channels on a slope with rollers on which the packages slide due to gravity; such rollers are not motorised.

Such systems are highly inefficient and unreliable due to the stability of the packages since they determine an accumulation of packages (in contact with one another) before the output from the channel.

Other movement systems of the prior art envisage motorised clutched rollers with a single common motorisation for all the rollers; when higher strain than a predefined threshold is detected at one roller, the roller is clutched; this leads to a difference between the velocity of the clutched roller (substantially null) and of the contiguous motorised rollers (not null velocity).

Unfortunately this operation is risky for the stability of packages that may be subject to accumulations, rotations, overturning and consequent damage.

The operation is, also, risky in terms of maintaining the order set upstream in the ordering system.

In fact, it often happens, especially with heterogeneous packages, i.e. with different formats, sizes and types of packaging, that due to the clutching of some rollers, some packages of larger sizes, and arranged behind packages of smaller sizes, pivot on the stationary packages with smaller sizes ending up rotating which causes potential overturning or a change in the ordering sequence of the packages themselves.

The ordering of the packages is pre-established based on precise dictated packing rules, for example, the need to have a pallet packed with heterogeneous packages that is stable and able to withstand transport to a predefined destination.

Consequently, it is likely that the packages reaching palletising in the incorrect order, if they are different sizes from those envisaged in that order, will be intercepted by a manual or automatic control system, which causes the line to slow down or even stop for the consequent rearranging.

The waiting times for rearranging lead to severe delays in the dispatching process. Occasionally it also happens that pallets made with incorrect sequences of packages are sent anyway, which causes serious health risks for the people involved in the delivery processes.

An aim of the present invention is to provide a system and method for ordering elements, which obviates the drawbacks of the prior art.

The specific aim of the present invention is to provide a safe and efficient system and method for ordering elements.

A further aim of the present invention is to provide a safe and efficient system and method for ordering elements with low control complexity.

SUMMARY OF THE INVENTION

In a first aspect the invention describes a system and method for ordering elements comprising:

at least one source of elements comprising randomly arranged elements;

a plurality of source output lines associated to the at least one source;

a synchronising station comprising a plurality of synchronising channels in which each source line of the plurality is associable to one or more of the synchronising channels;

wherein at least the synchronising channels comprise a plurality of synchronised transport means configured for supporting and moving elements, wherein said synchronised transport means $M_{ij}$ comprises reciprocally independent corresponding motorising means $MM_{ij}$.

a processing unit configured for starting up and timing the functions of one or more from among at least the source of elements, the plurality of source output lines and the synchronising station, wherein the processing unit comprises a synchronising module configured for independently sending to each motorising means one from among a setting signal of a predefined velocity and a stop signal.

Advantageous aspects are included in the dependent claims.

In a second aspect, the present invention describes a method for ordering elements comprising the steps of:

providing at least one source of elements comprising randomly arranged elements;

providing a plurality of source output lines associated to the at least one source;

providing a plurality of synchronising channels, in which each source output line of said plurality is associable to one or more of the synchronising channels;

wherein at least said synchronising channels comprise a plurality of synchronised transport means configured for supporting and moving groupable elements, wherein said synchronised transport means $M_{ij}$ comprises reciprocally independent corresponding motorising means $MM_{ij}$;

synchronising the transport means of the plurality sending, independently to each motorising means, one from among a setting signal of a predefined velocity or a stop signal.

Advantageous aspects are included in the dependent claims.

In a third aspect, the present invention describes a method performed through a calculator for implementing the steps described in the second aspect of the invention.

The invention, as described, provides a tool for ordering elements, in particular for subsequent packaging, which guarantees safety and efficiency in ordering and in the subsequent movement and delivery steps.

The solution of the invention performs a multiplicity of technical effects:
- it allows the packages moving on the movement channels not to get damaged, since an accumulation of packages cannot form, unlike what happens in known gravity or clutched systems.
- it also allows two or more packages to be handled alongside one another on the same means of transport (compatibly with the size), reducing the number of means of transport necessary (cost and space savings); this is physically impossible in gravity or clutched systems, due to instability and/or possible crossing over;
- it prevents heterogeneous packages (e.g. one larger and one consecutive smaller one) crossing over;
- it prevents packages getting stuck, as can actually happen with gravity or clutched rollers;
- it allows a very wide range of types of packages to be handled.

The technical effects/advantages cited and other technical effects/advantages of the invention will emerge in further detail from the description provided herein below of an example embodiment provided by way of approximate and non-limiting example with reference to the attached drawings.

DETAILED DESCRIPTION

The present invention relates to a method and system for ordering elements, for subsequent packaging.

In the preferred embodiment, the elements are packages comprising a variable number of items from package to package and a different composition, as well as obviously having different sizes and weights.

In drinks, for example, a package may be a 6-bottle pack of a drink or, in food, a package may be a single pack of pasta.

Packages of different types may also comprise products in the toys, cosmetics and detergents sectors etc.

In the preferred embodiment, the packaging is performed through packing a pallet (palletising) which can be performed manually or with automated procedures and systems.

Figure 1:
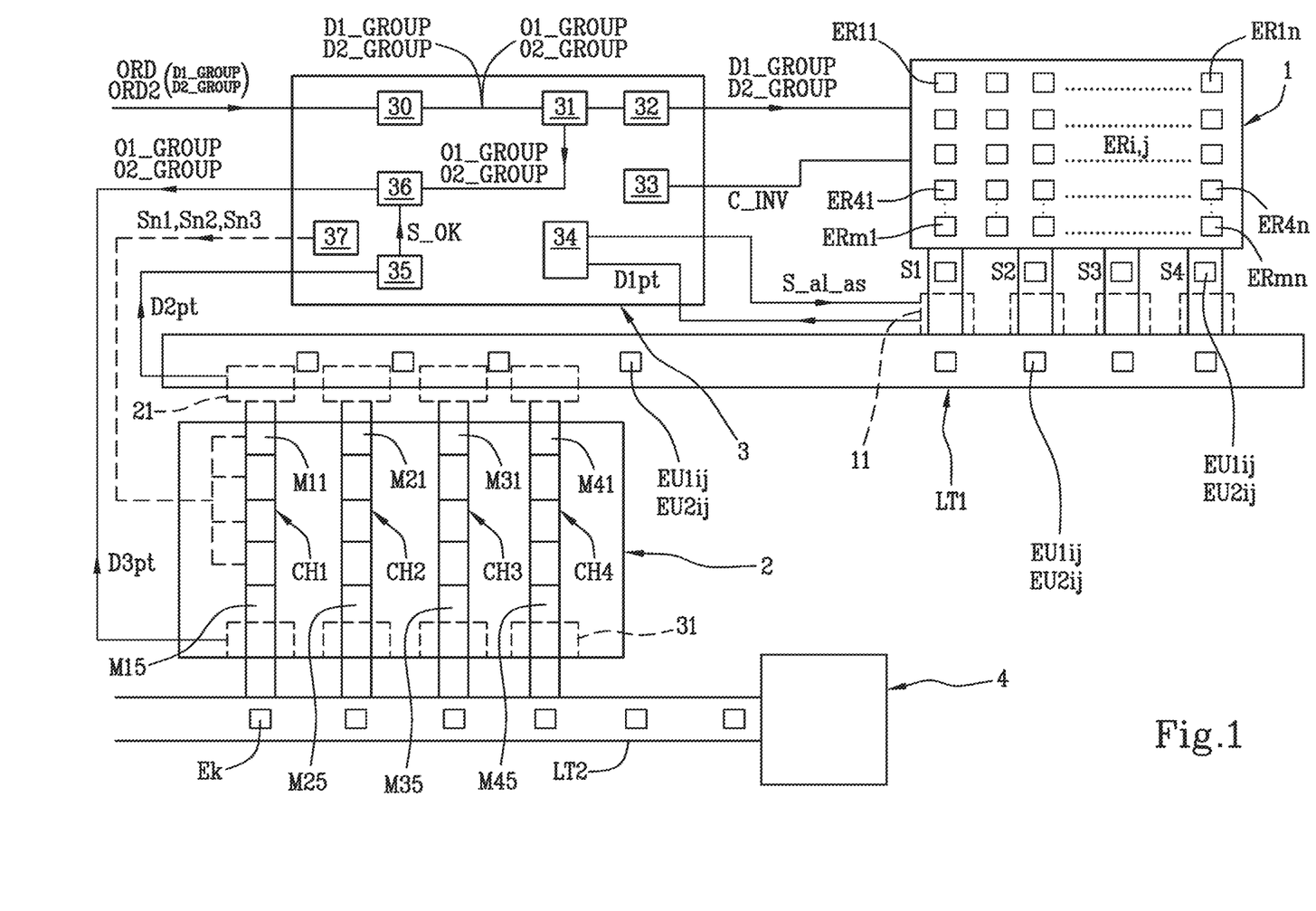
FIG. 1 is an overall view of the system according to the invention.
Figure 2A:
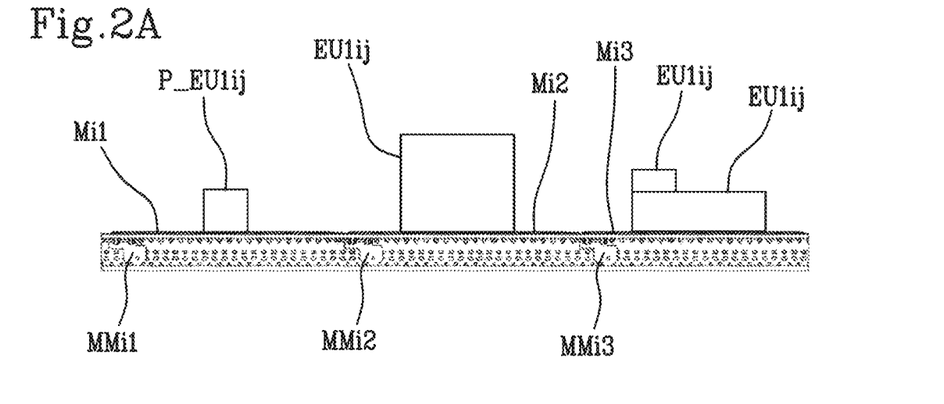
FIGS. 2A, 2B and 2C show, from different views, a preferred embodiment of the invention.
Figure 2B:
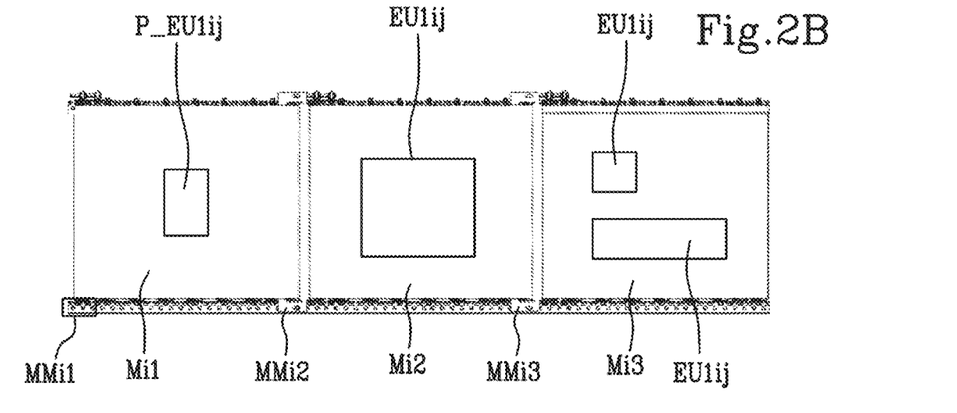
Figure 2C:
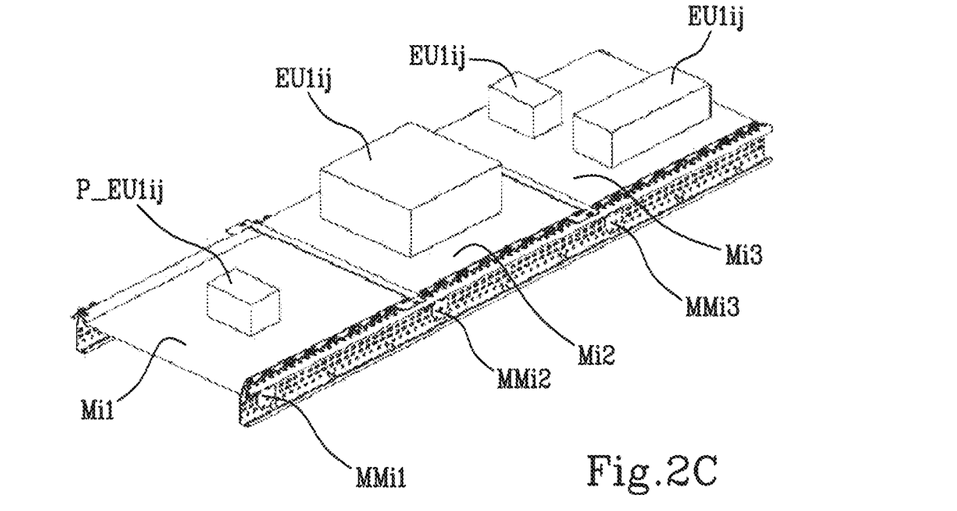

With reference to FIGS. 1 and 2, the invention provides for ordering elements comprising the steps of providing at least one source of elements 1 comprising randomly arranged elements ERij, providing a plurality of source output lines S1,S2,S3,S4 and a plurality of synchronising channels CH1,CH2,CH3,CH4 in which each output source line S1,S2,S3,S4 can be associated to one or more of the channels CH1,CH2,CH3,CH4, in which at least the synchronising channels CH1,CH2,CH3,CH4 comprise a plurality of synchronised means of transport Mij, the latter comprising reciprocally independent corresponding motorising means MMij.

A flow of elements will now be described, in particular packages, in a medium to large warehouse, i.e. of a size that requires an automation process that handles the incoming elements, their sorting and the current ordering in order to reach the final packaging.

Packages coming from remote production sites, or large remote single-brand or single-product warehouses, are stored in a local warehouse and in homogeneous pallets, i.e. housing packages of the same kind (e.g. a 6-bottle pack of Coca Cola, a 4-bottle pack of beer etc.) as they arrive directly from production and packaged at the exit thereof.

In a subsequent step, the homogeneous pallets are stored inside local automatic warehouses in random positions, i.e. not necessarily arranged with contiguous identical pallets, maintaining a mapping of the positions of the individual pallets present.

In a further step, the pallets are disassembled and the individual packages (hereinafter referred to as elements) are stored in local warehouses with random access (defined below as source station of elements 1), maintaining a corresponding mapping of the packages present. This step is defined as depalletisation.

In other words, a processing unit 3 in the system according to the invention will keep track of the location of each individual element in the source station of elements 1 in order to allow their immediate localisation and precise retrieval.

In general, the individual elements are stored in the source station of elements 1 in which each source station comprises randomly arranged elements ERij according to a specific positioning map MP.

Preferably, a source station of elements 1 comprises warehouses with random access crossed by corridors with shelves in which the elements are stored heterogeneously, i.e. with different contiguous products, but preferably identifiable with a positioning map MP, preferably with a matrix in which the lines and columns j of the matrix preferably correspond to the corridors of the source of elements 1.

Alternatively, or additionally, a source station of elements 1 comprises small warehouses with random access or manual depalletisation lines, filled in the depalletisation step described, according to a pre-established positioning map MP.

In other words, a first important step of the sequential grouping according to the invention is providing at least one source station of elements 1 comprising randomly arranged elements ERij; (i=line number; j=element position in line) preferably according to a specific positioning map MP.

Each element ERji is identified univocally by the processing unit 3 which knows at all times, through appropriate encoders and sensors, its position and timing.

The source station 1 comprises a plurality of source output lines S1, S2, S3, S4.

The processing unit 3 knows at a predefinable time the position of each element in a sequence of elements at the output from the plurality of source output lines S1, S2, S3, S4.

Preferably, a first detection means 11 is positioned at the exit of the source output lines for detecting, at a predefinable time, the positioning and order of the elements at the output from the source output lines.

The system according to the invention further comprises a synchronising station 2 comprising a plurality of synchronising channels CH1, CH2, CH3, CH4 in which a source line S1, S2, S3, S4 is associable to one or more of the channels CH1, CH2, CH3, CH4.

Once the association has been defined, a channel remains associated, at least temporarily, to only one source output line.

The association between output lines and synchronising channels is, in the first instance, selectable as a function of the packaging requirements of the elements.

In a preferred embodiment of the invention, the association between output lines and synchronising channels is defined as a function of a uniformity of the transfer times between the first and the second.

In other words, in the preferred embodiment, the association is:

S1→CH1
S2→CH2
S3→CH3
S4→CH4

The technical effect achieved is the definition of a transfer time that is substantially comparable between the different pairs of output lines-channels.

Preferably, a second detection means 21 is positioned at the input to the synchronising channels CH1,CH2,CH3,CH4 for detecting, at a predefinable time, the positioning and order of the elements that enter the synchronising channels CH1,CH2,CH3,CH4.

Preferably, a third detection means 31 is positioned at the output from the synchronising channels CH1,CH2,CH3, CH4 for detecting, at a predefinable time, the positioning and order of the elements at the output from the synchronising channels CH1,CH2,CH3,CH4.

With particular reference to FIGS. 2A, 2B and 2C, advantageously, at least the associated synchronising channels CH1,CH2,CH3,CH4 comprise a plurality of synchronised transport means Mij configured to support and move the first groupable elements EU1$ij$.

According to the invention, the synchronised transport means Mij comprises reciprocally independent corresponding motorising means MMij.

The technical effect achieved is the direct control of every motorising means MMij.

The immediate advantage deriving from this effect is greater precision in setting the movements related to the synchronised transport means Mij.

According to the invention, the aforementioned synchronisation is performed by independently sending to each motorising means MMij one from among a setting signal Sn1 of a predefined velocity V and a stop signal Sn3.

Preferably, the synchronised transport means Mij comprises pads having independent motorisation.

Preferably, the motorised means MMij is realised by means of motorised rollers.

There are multiple technical effects of the use of motorised rollers:
- about 250% reduction in costs with respect to traditional systems performed with modular networks and asynchronous motors;
- reduction in necessary power and energy consumption. For each motorised roller module the installed power is reduced from the 370 Watt of the traditional asynchronous motor to 50 Watt.

According to the invention, the aforementioned synchronisation sends the same setting signal Sn1 of a predefined velocity V to motorising means MMij of respective adjacent synchronised transport means Mij for causing groupable elements EU1$ij$ to transit from one to another of the adjacent means.

In other words, the invention envisages that as one package passes from one movement means Mij, for example M11, to another adjacent movement means Mij, for example M12, the two movement means are synchronised with the same setting signal Sn1, of the predefined velocity V.

In yet other words, the movement means M11 and M12 move at the same velocity V set by the same velocity signal Sn1.

The technical effect achieved is the precise control of the movement of each element.

The advantage immediately deriving from this effect is the impossibility for elements to accumulate, unlike what happens in the prior art.

According to the invention, the aforementioned synchronisation manages an input step of the groupable elements EU1$ij$ in a synchronising channel CH1, CH2, CH3, CH4.

Such step envisages sending the setting signal Sn1 of a predefined velocity V to motorising means MMi1 of a first synchronised transport means Mi1 of a channel, in which the first synchronised transport means Mi1 is configured for supporting and moving first elements P_EU1$ij$ of the first groupable elements EU1$ij$;

Such step further provides for sending a stop signal Sn3 to each motorising means MMij (with j>1) of synchronised transport means Mij (with j>1) downstream of said first synchronised transport means Mi1.

In other words, upon reaching the first elements P_EU1$ij$ at the input to the synchronising channel, only the first synchronised transport means moves to transport the elements, while the others remain stationary.

According to the invention, the aforementioned synchronisation manages a compacting step without the accumulation of groupable elements EU1$ij$ in proximity to an output from a synchronising channel CH1, CH2, CH3, CH4.

Such step envisages sending a stop signal Sn3 to each motorising means MMij of at least a synchronised transport means Mij predisposed at the output from the synchronising channel CH1, CH2, CH3, CH4, and awaiting the setting signal Sn1 for the output.

In other words, it is envisages that the synchronised transport means in proximity to the output is stationary and awaiting to unload the elements from the channel.

Such step also envisages detecting the synchronised transport means Mij which supports first groupable elements EU1$ij$ in said synchronising channel CH1, CH2, CH3, CH4.

In other words, it is envisaged the detection of the synchronised transport means that is transporting elements.

This step further envisages detecting whether downstream of the synchronised transport means Mij that supports first groupable elements EU1$ij$ and upstream of the at least one synchronised transport means Mij provided at the output, a synchronised transport means Mij is present that does not support any element.

If it is present, the step envisages sending the setting signal Sn1 of a predefined velocity V to motorised means MMij of every synchronised transport means that supports the first groupable elements EU1$ij$ and that is not at the output, so that the first groupable elements EU1$ij$ are transported to the synchronised transport means adjacent to the first synchronised transport means Mij stationary at the output.

In other words, each transport means synchronised with elements predisposed upstream of an empty synchronised means, is moved to compact the highest number of elements towards the output but without creating accumulations of elements.

According to the invention, the aforementioned synchronisation is also performed by independently sending to each motorising means MMij a signal Sn2 for changing ΔV the predefined velocity V.

In other words, one or more synchronised transport means started up at a predefined velocity V can be accelerated or slowed down with the variation signal Sn2.

According to the invention, the aforementioned synchronisation manages an output step of the first groupable elements EU1$ij$ from a synchronising channel CH1, CH2, CH3, CH4.

This step envisages sending a setting signal Sn1 of a predefined velocity V to motorising means MM$ij$ of a synchronised transport means M$ij$ which supports elements and is predisposed at the output from the channel;

This step further envisages sending a signal Sn2 for changing $\Delta V$ the predefined velocity V to the synchronised transport means M$ij$, so that it is moved in output from said channel.

In particular $\Delta V>0$.

In other words, to allow an output of the element on the second transport line LT2, so that the element does not overturn, the velocity for launching the element perpendicularly to the aforementioned second transport line LT2 must be higher than the predefined movement velocity V within the synchronisation channel CH1, CH2, CH3, CH4.

This output step further envisages sending the same setting signal Sn1 of a predefined velocity V to motorising means MM$ij$ of respective adjacent synchronised transport means M$ij$, and upstream of the synchronised transport means M$ij$ predisposed at the outlet from said channel, so as to cause first groupable elements EU1$ij$ between respective adjacent means to transit up to occupying the first motorising means MM$ij$ freed by the output of the elements from the channel towards the second transport line LT2.

The system according to the invention comprises, as already mentioned, the processing unit 3 configured to start up and time the functions of one or more of at least the source station of elements 1, the plurality of source output lines S1, S2, S3, S4 and the synchronising station 2.

Preferably, the processing unit 3 is configured for performing the functions described as a function of data representing the position and timing received from one or more first detection means 11, the second detection means 21 and the third detection means 31.

In particular, the processing unit 3 is configured for receiving first data representing the position and timing D1$pt$ from the first detection means 11.

In particular, the processing unit 3 is configured for receiving second data representing the position and timing D2$pt$ from the second detection means 21.

In particular, the processing unit 3 is configured for receiving third data representing the position and timing D3$pt$ from the third detection means 31.

The system according to the invention receives a first order ORD1 comprising a list of elements sufficient for preparing a pallet to be sent to the requester. Such requested elements are stored in the source station in a random order according to the positioning map MP; in other words, the first order ORD comprises first grouping data D1_group representing groupable elements EU1$ij$ according to a predetermined criterion, among the randomly arranged elements Er$ij$ in the source station 1.

In general, it should be noted that in the present context and in the subsequent claims, the processing unit 3 is presented as being split into distinct functional modules (storage modules or operative modules) for the sole purpose of describing its functionalities clearly and completely.

In actual fact, this processing unit 3 can comprise a single electronic device, appropriately programmed to perform the functionalities described, and the different modules can correspond to hardware entities and/or routine software that are part of the programmed device.

Alternatively, or in addition, such functions may be performed by a plurality of electronic devices over which the aforesaid functional modules can be distributed.

The processing unit 3 can also make use of one or more processors for executing the instructions contained in the storage modules.

The aforementioned functional modules can also be distributed on different local or remote computers, depending on the architecture of the network in which they reside. The processing unit 3 comprises a conversion module 30 configured for processing the first order ORD and establishing a first sequential order O1_group of the requested elements such that the integrity and stability of the subsequent packaging is guaranteed. Preferably, a precise arrangement according to the weights of the elements and the sizes thereof determines the positioning during packaging (e.g. pallets) which will be sent to the requester.

The processing unit 3 comprises a receiving module 31 configured so as to receive a request for sequential grouping Req for said randomly arranged elements ER$ij$.

The request Req comprises the first grouping data D1_group representing the first groupable elements EU1$ij$, among the randomly arranged elements Er$ij$, and the first sequential ordering O1_group of the groupable elements EU1$ij$.

The invention envisages selecting the randomly arranged elements ER$ij$ as a function of the first grouping data D1_group, so as to determine first grouped elements EU1$ij$ In order to do so, the processing unit 3 comprises a selection module 32 configured for receiving the first grouping data D1_group from the receiving module 31 and for selecting the randomly arranged elements ER$ij$ in the source station of elements 1 as a function of the first grouping data D1_group received, so as to determine first grouped elements EU1$ij$.

In other words, once the order has been received and interpreted in terms of the corresponding positions of the packages in the source station, the system according to the invention activates means for locating the packages in the source station, whether they are automated, semi-automated or manual means, for locating the requested elements among those available in the source station.

The processing unit 3 comprises a first control module 33 configured for determining a send command C_inv of the first groupable elements EU1$ij$ towards the source output line S1,S2,S3,S4, in which each output line is configured to receive asynchronously with respect to the other lines at least a part of the first groupable elements EU1$ij$.

According to the invention, the processing unit 3 further comprises a second control module 34 configured for determining asynchronous feeding S_al_as of the first grouped elements EU1$ij$ from the source lines S1,S2,S3,S4 towards one or more of the respective associated synchronising channels CH1,CH2,CH3,CH4.

The technical effect achieved is that no interlocking occurs between the source lines; any negligible delay is only dictated by the transit time of an element in front of a subsequent source line when two elements are simultaneously available on two lines in succession with one another.

According to the invention, the second control module 34 is configured for determining the feeding as a function of the first data representing the position and timing D1$pt$ detected by the first detection means 11.

In particular, the second control module 34 is configured to determine asynchronous alignment S_al_as of the first groupable elements EU1$ij$ from the source lines S1,S2,S3,S4 towards one or more of the respective associated synchronising channels CH1,CH2,CH3,CH4 as soon as the first groupable elements EU1*ij* are available on the source lines S1,S2,S3,S4, without delay.

In other words, as soon as an element reaches, on the output line, the crossing point with the first transport line LT1, such element can enter the first transport line LT1, even if the subsequent elements of the same output line are still behind, in the warehouse, i.e. not yet available on the line.

The technical effect achieved by the transport without delay and without ordering the elements from the source lines to the synchronising channels is the quick disengagement of the source lines so that they are ready as soon as possible for receiving the elements of a subsequent order.

Alternatively, the second control module 34 is configured to determine asynchronous alignment S_al_as of the first groupable elements EU1*ij* from the source lines S1,S2,S3,S4 towards one or more of the respective associated synchronising channels CH1,CH2,CH3,CH4 as soon as a plurality of first groupable elements EU1*ij* is available on different source lines S1,S2,S3,S4.

The technical effect achieved is that the transport from the source lines to the synchronising channels is periodically activated with energy savings, to groups of elements.

According to the invention, the processing unit 3 comprises a synchronising module 37 (FIG. 1) configured for sending, independently to each motorising means MM*ij*, one from among:

a setting signal Sn1 of a predefined velocity V;
a stop signal Sn3.

According to the invention, the synchronising module 37 is further configured for performing the steps described above in relation to the method according to the invention.

Precisely, the synchronising module 37 is configured so as to manage an input step of the first groupable elements EU1*ij* in a synchronising channel CH1, CH2, CH3, CH4.

Furthermore, the synchronising module 37 is configured for compacting without accumulation first groupable elements EU1*ij* in proximity to an output from a synchronising channel CH1, CH2, CH3, CH4.

Furthermore, the synchronising module 37 is configured so as to manage an output step of the first groupable elements EU1*ij* from a synchronising channel CH1, CH2, CH3, CH4.

The invention envisages that, after receiving all the first groupable elements EU1*ij* in input to the synchronising channels CH1,CH2,CH3,CH4, the sequential ordering of the first groupable elements EU1*ij* takes place at the output from the synchronising channels CH1,CH2,CH3,CH4 and as a function of the first sequential ordering O1_group.

To do so, the processing unit 3 comprises a control module 35 configured for monitoring the first groupable elements EU1*ij* in input to the synchronising channels CH1,CH2,CH3,CH4, and emitting a confirmation signal S_ok when all the first groupable elements EU1*ij* have entered the synchronising channels CH1,CH2,CH3,CH4.

According to the invention, the control module 35 is configured for monitoring as a function of the second data representing the position and timing D2*pt* detected by the second detection means 21.

The processing unit 3 further comprises a sequential ordering module 36 configured for controlling the presence of the confirmation signal S_ok at the output from the control module 35 and, if the signal S_ok is present, receiving the first sequential ordering O1_group from the receiving module 31 and sequentially ordering the first groupable elements EU1*ij* at the output from the synchronising channels CH1,CH2,CH3,CH4 as a function of such first sequential ordering O1_group, determining grouped and sequentially ordered elements Ek.

According to the invention, the sequential ordering module 36 is configured for detecting the output of the grouped and sequentially ordered elements Ek as a function of the third data representing the position and timing D3*pt* detected by the third detection means 31.

The technical effect achieved is the zeroing of the waiting times for locating elements in succession in a sequential grouping request. The technical effect is determined by the fact that the ordering of the elements, i.e. their sequence, is assigned to the destination channels when all the elements are available in the channels and not to the source elements that receive the elements in an unsynchronised way, i.e. with delays between the receipt of different elements.

The invention also envisages receiving a new order ORD2 subsequent to the first order ORD1 identified by second grouping data D2_group for determining second groupable elements EU2*ij* in which the receipt of the second grouping data D2_group takes place as soon as possible after the step of asynchronously feeding the first groupable elements EU1*ij* from one or more of the source output lines S1,S2, S3,S4 towards one or more of the respective associated synchronising channels CH1,CH2,CH3,CH4, performed by the second control module 34.

To do so, the receiving unit 31 is configured so as to receive a second request for sequential grouping Req2 for the randomly arranged elements ER*ij*.

The request Req2 comprises the second grouping data D2_group representing the second groupable elements EU2*ij*, among the randomly arranged elements ER*ij*, and the second sequential ordering O2_group of the second groupable elements EU2*ij*.

According to the invention, the selection module 32 is configured in order to select the randomly arranged elements ER*ij* in the at least one source station of elements 1 as a function of the second grouping data D2_group, so as to determine second groupable elements EU2*ij* and the selection step as a function of the second grouping data D2_group takes place as soon as possible after the previous step of asynchronously feeding the first grouped elements EU1*ij* from one or more of the source output lines S1,S2,S3,S4 towards one or more of the respective associated synchronising channels CH1,CH2,CH3,CH4, performed by the second control module 34.

In other words, the packages from a subsequent pallet for packaging must leave and be placed in the channels, behind those of the previous pallet, since their (ordered) output from the source output lines towards palletising will only be controlled after the output of the last package from the previous pallet.

As already mentioned, through its operating modules, the processing unit 3 will know the timing and position of each element in the sequence of elements at the output from the plurality of source output lines S1,S2,S3,S4 and will allow the sending on the first transport line LT1 of the elements of the new order ORD2 at the end of the sending on the first transport line LT1 of the elements of the first order ORD.

The technical effect achieved is a drastic reduction in the sequential grouping times (and therefore in the consequent packing times) determined by the movement of the ordering of the elements in the synchronising channels which leaves the source lines S1,S2,S3,S4 free to receive elements of a new grouping, even before the previous sequential order has finished.

In particular, a further technical effect achieved is the minimisation of the waiting times for the transfer to the synchronising channels guaranteeing the other source output lines are free and usable for a new order as soon as possible.

The system according to the invention comprises a first transport line LT1 configured for transporting the groupable elements EU1$ij$, EU2$ij$ from the plurality of source output lines S1,S2,S3,S4 to the plurality of synchronising channels CH1,CH2,CH3,CH4.

The movement of the first transport line LT1 is a continuous movement in the case in which the asynchronous feeding S_al_as takes place as soon as the groupable elements EU1$ij$,E2$ij$ are available on the source lines S1,S2,S3,S4, without delay.

Alternatively, the movement of the first transport line LT1 is a periodic movement in the case in which the asynchronous feeding S_al_as takes place as soon as a plurality of groupable elements EU1$ij$,E2$ij$ is available on the different source lines S1,S2,S3,S4.

Alternatively, the movement of the first transport line LT1 is one of the described continuous or periodic movements activatable in presence of at least one element available in one of the source lines S1,S2,S3,S4.

Downstream of the synchronising station 2, the system comprises a packing station 4, preferably a palletising packing station.

The system comprises a second transport line LT2, configured for transporting the grouped and ordered elements Ek in output from the synchronising channels CH1, CH2, CH3, CH4, towards the packing station 4, preferably a palletising packing station.

In conclusion, the system and method according to the present invention in its alternative embodiments allows notable technical effects.

In general, the sequential grouping of elements is made flexible in implementation and performed in reduced times with respect to what happens in the prior art.

In particular:

no interlocking occurs between the source lines, any negligible delay is only dictated by the transit time of an element in front of a subsequent source line when two elements are simultaneously available on two lines in succession with one another;

quick disengagement of the source lines is guaranteed so that they are ready as soon as possible to receive elements of a subsequent order;

the transport from the source lines to the synchronising channels is periodically activated with energy savings, to groups of elements.

the waiting times for locating elements in succession in a sequential grouping request are zeroed.

there is a drastic reduction in the sequential grouping times (and therefore in the consequent packing times) determined by the movement of the ordering of the elements in the synchronising channels which leaves the source lines free to receive elements of a new grouping, even before the previous sequential order has finished.

The use of synchronised transport means with reciprocally independent corresponding motorising means MM$ij$:

allows the packages moving on the movement channels not to get damaged, since an accumulation of packages cannot form, unlike what happens in known gravity or clutched systems.

also allows two or more packages to be handled alongside one another on the same means of transport (compatibly with the size), reducing the number of means of transport necessary (cost and space savings); this is physically impossible in gravity or clutched systems, due to instability and/or possible crossing over;

prevents heterogeneous packages (e.g. one larger and one consecutive smaller one) crossing over;

prevents packages getting stuck, as can actually happen with gravity or clutched rollers;

handles a decisively wide range of packages.

In particular, in the reciprocally independent motorising means MM$ij$, the use of motorised rollers guarantees:

a) about 250% reduction in costs with respect to traditional systems performed with modular networks and asynchronous motors;

b) reduction in necessary power and energy consumption. For each motorised roller module the installed power is reduced from the 370 Watt of the traditional asynchronous motor to 50 Watt;

c) greater stability of packages; with respect to the gravity systems of the prior art, the motorised rollers allow a much wider range of packages to be managed, even heterogeneous, preventing them crossing over and/or getting stuck during advancement.

The technical effects listed undoubtedly contribute to making the sequential grouping of elements according to the invention more efficient and optimised.

The invention claimed is:

1. An element ordering system, comprising:
(a) a source with a plurality of elements, wherein the elements are randomly arranged;
(b) a plurality of output lines, wherein the output lines are associated to the source with the plurality of elements;
(c) a synchronising station comprising a plurality of synchronising channels,
wherein each of the output lines can be associated to one or more of the synchronising channels,
wherein the synchronising channels comprise a plurality of synchronised transport means configured to support and move a first group of elements from the plurality of elements, wherein the plurality of synchronised transport means comprises mutually independent corresponding motorising means;
(d) a processing unit configured to start up and perform the timing of a plurality of functions of the source with plurality of elements, and configured to start up and perform the timing of said plurality of output lines and said synchronising station,
wherein said processing unit comprises a synchronising module configured to independently send to each motorising means, one from among:
i. a setting signal of a predefined velocity; and
ii. a stop signal;
(e) a receiving module configured to receive a request for sequential grouping of a randomly arranged group of elements of the plurality of elements, wherein the request comprises:
i. a first grouping data representative of a first group of elements from the plurality of elements, among said randomly arranged group of elements of the plurality of elements, and
ii. a sequential ordering of said first group of elements from the plurality of elements;
(f) a control module configured for:
i. monitoring the first group of elements from the plurality of elements in input to said synchronising channels; and ii. emitting a confirmation signal when all the first group of elements from the plurality of elements have entered said synchronising channels; and
(g) a sequential ordering module configured for:
  i. controlling a presence of said confirmation signal in output from said control module; and
  ii. if said signal is present, sequentially ordering said first groupable elements in output from said synchronising channels as a function of said first sequential ordering, determining grouped and sequentially ordered elements.

2. The system according to claim 1, wherein said synchronising module is configured to send said setting signal of a predefined velocity to motorising means of respective adjacent synchronised transport means, in order to cause the first group of elements from the plurality of elements to transit from one transport means to another of an adjacent transport means.

3. The system according to claim 2, wherein said synchronising module is configured to manage an inputting step of said first group of elements from the plurality of elements into one of the synchronising channels, by:
(a) sending said setting signal of a predefined velocity to motorising means of a first synchronised transport means of the plurality of synchronised transport means configured to support and move a first subset of elements of the first group of elements from the plurality of elements; and
(b) sending a stop signal to each motorising means of the synchronised transport means downstream of the first synchronised transport means.

4. The system according to claim 1, wherein said synchronising module is configured to manage an inputting step of said first group of elements from the plurality of elements into one of the synchronising channels, by:
(a) sending said setting signal of a predefined velocity to motorising means of a first synchronised transport means of the plurality of synchronised transport means configured to support and move a first subset of elements of the first group of elements from the plurality of elements; and
(b) sending a stop signal to each motorising means of the synchronised transport means downstream of the first synchronised transport means.

5. The system according to claim 1, wherein said synchronising module is configured to manage a compacting step without accumulation of first group elements from the plurality of elements in proximity of an output from a synchronising channel by:
(a) sending a stop signal to each motorising means of the synchronised transport means provided at the output from said synchronising channel and waiting for said setting signal for the output;
(b) detecting the synchronised transport means that support the first group of elements from the plurality of elements in said synchronising channel; and
(c) sending said setting signal of a predefined velocity to motorising means of each synchronised transport means which supports first elements and which is not at the output if, downstream of the synchronised transport means which support first group of elements of the plurality of elements and upstream of the synchronised transport means provided at the output, synchronised transport means are present that do not support any element, wherein this sending said setting signal results in said first group of elements from the plurality of elements are transported up to the synchronised transport means adjacent to the first synchronised transport means stationary at the output.

6. The system according to claim 1, wherein said synchronising module is configured for sending, independently, to each motorising means a signal for changing said predefined velocity.

7. The system according to claim 6, wherein said synchronising module is configured to manage an output step of a first group of elements from the plurality of elements from a synchronising channel by:
(a) sending a setting signal of a predefined velocity to motorising means of a synchronised transport means that supports corresponding elements and is predisposed at the output from said channel;
(b) sending a signal for changing said predefined velocity to said synchronised transport means, such that said synchronised transport means is moved in from output from said channel; and
(c) sending said same setting signal of a predefined velocity to motorising means of respective adjacent synchronised transport means, and to motorising means upstream of the synchronised transport means provided at the outlet from said channel, in order to cause first group of elements from the plurality of elements between respective adjacent means to transit up to occupying the first motorising means freed by the output of the elements from the channel.

8. The system according to claim 1, wherein said plurality of synchronised transport means comprise pads having independent motorisation.

9. The system according to claim 8, wherein said plurality of motorising means are realised by means of motorised rollers.

10. The system according to claim 1, wherein said plurality of motorising means are realised by means of motorised rollers.

11. The system according to claim 1, wherein each of the plurality of output lines can be associated to one or more of the synchronising channels as a function of a uniformity of transfer times between the source lines and the synchronising channels.

12. The system according to claim 1, wherein each output line of said plurality of source output lines is configured for asynchronously receiving at least a part of said first group of elements from the plurality of elements with respect to the other lines.

13. The system according to claim 12, further comprising a second transport line, configured for transporting said grouped and ordered elements in output from said synchronising channels towards said packing station.

14. The system according to claim 1, further comprising a packing station.

15. The system according to claim 14, further comprising a second transport line, configured for transporting said grouped and ordered elements in output from said synchronising channels towards said packing station.

16. The system according to claim 1, further comprising a second transport line, configured for transporting said grouped and ordered elements in output from said synchronising channels towards said packing station.

17. The system according to claim 1, further comprising a station with the plurality of elements, wherein said station comprises an element storage system, preferably one or more from among manual and automatic storage warehouses.

18. An element ordering method, comprising:
(a) providing a source with a plurality of elements, wherein the elements are randomly arranged;
(b) providing a plurality of output lines, wherein the output lines are associated to the source with the plurality of elements;
(c) providing a plurality of synchronising channels, wherein each of the output lines can be associated to one or more of the synchronising channels, wherein the synchronising channels comprise a plurality of synchronised transport means configured to support and move a first group of elements from the plurality of elements, wherein the plurality of synchronised transport means comprises mutually independent corresponding motorising means; and
(d) synchronising the plurality of transport means by sending independently to each corresponding motorising means, one of:
  i. a setting signal of a predefined velocity; and
  ii. a stop signal;
(e) receiving a request for sequential grouping of randomly arranged group of elements of the plurality of elements, wherein said request comprises:
  i. a first grouping data representative of a first group of elements from the plurality of elements, among said randomly arranged group of elements of the plurality of elements, and
  ii. a sequential ordering of said first group of elements from the plurality of elements;
(f) controlling by:
  i. monitoring the first group of elements from the plurality of elements in input to said synchronising channels; and
  ii. emitting a confirmation signal when all the first group of elements from the plurality of elements have entered said synchronising channels; and
(g) sequentially ordering by:
  i. controlling a presence of said confirmation signal in output from said control module; and
  ii. if said signal is present, sequentially ordering said first groupable elements in output from said synchronising channels as a function of said first sequential ordering, determining grouped and sequentially ordered elements.

19. The element ordering method according to claim 18, further comprising synchronising adjacent group from the plurality of transport means, by sending the setting signal of a predefined velocity to respective motorising means, in order to cause the first group of elements from the plurality of elements to transit from one transport means to another of an adjacent transport means.

20. The element ordering method according to claim 19, wherein one or more steps of said method are implemented by means of a computer.

21. The element ordering method according to claim 18, wherein one or more steps of said method are implemented by means of a computer.

22. An element ordering system, comprising:
(a) a source with a plurality of elements, wherein the elements are randomly arranged;
(b) a plurality of output lines, wherein the output lines are associated to the source with the plurality of elements;
(c) a synchronising station comprising a plurality of synchronising channels,
  wherein each of the output lines can be associated to one or more of the synchronising channels,
  wherein the synchronising channels comprise a plurality of synchronised transport means configured to support and move a first group of elements from the plurality of elements, wherein the plurality of synchronised transport means comprises mutually independent corresponding motorising means, wherein said plurality of synchronised transport means comprise pads having independent motorisation; and
(d) a processing unit configured to start up and perform the timing of a plurality of functions of the source with plurality of elements, and configured to start up and perform the timing of said plurality of output lines and said synchronising station,
  wherein said processing unit comprises a synchronising module configured to independently send to each motorising means, one from among:
    i. a setting signal of a predefined velocity; and
    ii. a stop signal.

23. The element ordering system of claim 22, wherein said plurality of motorising means are realised by means of motorised rollers.

* * * * *